Aug. 6, 1935.  E. G. LEIGHTON  2,010,598
BAIT HOLDER
Filed Feb. 7, 1934
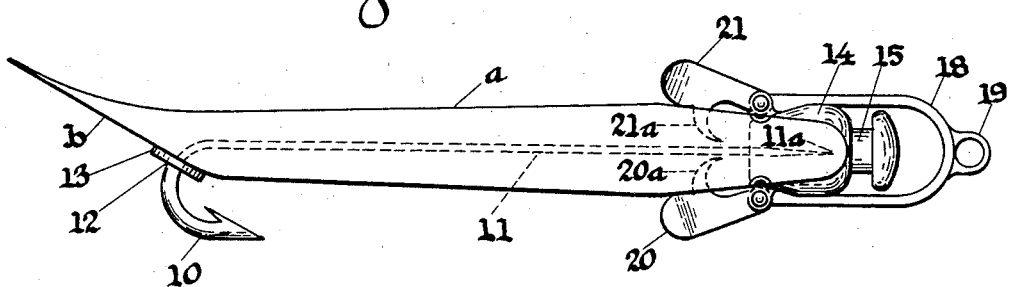
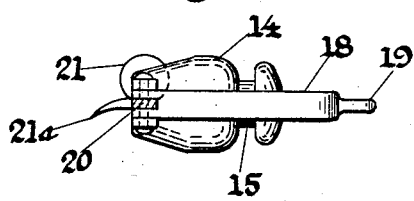
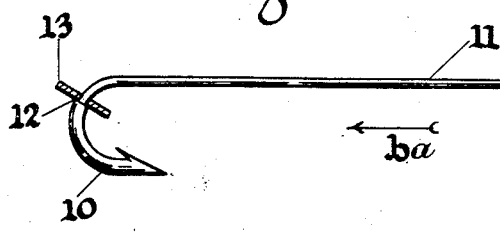
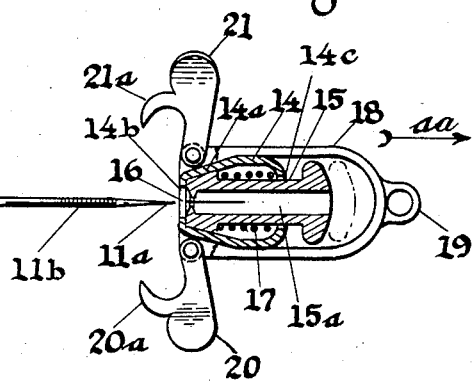
Inventor
Edward G. Leighton
By Ernest R. Llewellyn
Attorney.

Patented Aug. 6, 1935

2,010,598

UNITED STATES PATENT OFFICE 2,010,598

BAIT HOLDER

Edward G. Leighton, Belmont, Mass.

Application February 7, 1934, Serial No. 710,121

2 Claims. (Cl. 43—40)

My invention relates to fishing tackle and more particularly to a bait-holder adapted to receive a minnow or like fish lure.

Heretofore bait-holders of this type have usually been provided with a so-called threading needle, which is secured to a spinner, and a plurality of gang or cluster hooks. The threading needle is inserted, through the mouth of the lure, and extends into the body portion. One or more of the hooks of the clusters are inserted into the body of the lure to hold it in a fixed position, relative to the spinner. The operation of a device of this character is difficult and requires considerable skill to properly mount the lure to produce the desired effect, and even with the required experience, the operation of this device is particularly inconvenient under the usually experienced unfavorable conditions, such as in cold weather, etc., as is well known in the art of salmon fishing.

Accordingly, the object of my present invention is to provide a bait-holder whereby a quantity of minnows, or the like lures may be prepared with a fish hook, of a desired size, and in accordance with the size of the lure, with means for conveniently attaching the already baited hook to the spinner and whereby the hook may be as readily removed and replaced by a fresh, already baited, hook.

With the above and other objects in view, this invention comprises a novel combination and arrangement of parts hereinafter described and more specifically pointed out in the appended claims.

In the accompanying drawing I have shown my invention, on an enlarged scale, sufficient to enable those skilled in the art to understand the construction and operation thereof.

Referring to the drawing:—

Fig. 1 is a plan view of my bait-holder with a minnow secured thereto;

Fig. 2 is a detail of my fish hook;

Fig. 3 is a transverse section of my locking device and spinner; and

Fig. 4 is a side elevation of the parts as shown in Fig. 3, in this view one of the spinner arms is shown in section.

My fish hook 10, in this instance, is provided with a reduced shank 11 and forms a shoulder bearing 12 for the stop disc 13. The shank 11 is provided with a pointed terminating end 11a for convenience in inserting the shank 11 lengthwise through the body of the minnow a until the stop disc 13 abuts against the body of the minnow, adjacent the tail b, and the point 11a of the shank 11, extends into the mouth of the minnow, as illustrated at Fig. 1. It will be noted that the stop disc 13 is angularly disposed relative to the axis of the shank 11 whereby the tail b of the minnow is forced into a curved position, when the shank is inserted through the side of said minnow, and assists in imparting a rotary motion to the minnow.

My spinner comprises a hollow body portion 14 having a tapered end portion 14a and opposed end openings 14b, 14c. Mounted within said body portion 14 and extending therefrom, is my chuck or locking member 15 having a plurality of resilient jaw members 16, the periphery of which engages with the inner wall of the tapered portion 14a of the body 14. A compression spring 17 encircles a portion of the chuck shaft and has its bearing at one end against a shoulder formed at the jaw end of said member 16, the opposed end of said spring 17 bearing against the inner wall of the member 14. This spring normally forces the tapered periphery of the jaws to the left and in contact with the inner wall of the tapered body portion 14a and thereby retains said jaws in a closed position as illustrated at Fig. 3. In this instance I have provided a substantially U-shaped member 18 which is secured, in any suitable manner, to the body 14, said member 18 being provided with a projecting ring 19 to which the usual swivel and line (not shown) are attached in the well known manner.

I have provided opposed spinner arms 20, 21 which are pivotally attached to the body 14, the body portions of said arms 20, 21 may be of any of the usual and well known forms. Each of said arms 20, 21 is provided with an inwardly projecting hook portion 20a, 21a for a purpose hereinafter mentioned.

In attaching the baited hook, the chuck 15 is moved to the right, as indicated by broken lines, Fig. 3, against the spring 17, thus permitting the jaws 16 to open; the point 11a of the shank is then inserted into the bore 15a and the shank, which may be provided with serrations 11b, positioned for engagement; when the chuck member 15 is released, the spring 17 again forces the chuck 15 to the left and against the tapered inner wall 14a and whereby the jaws 16 are forced into engagement with said shank 11.

The opposed spinner arms 20, 21 are then moved inwardly and the hooks 20a, 21a engaged in the head of the minnow as illustrated at Fig. 1.

It will be noted that any pull, from the fishing line, will be in the direction of arrow aa, Fig. 3 and will exert a resistance pressure in the direction of arrow ba; any pull exerted on the hook will exert a force in the direction of arrow $ba$; this converse pull of the line and hook will act to tighten the jaws 16 on the shank 11.

Having thus described my invention it will be evident that many changes and modifications may be made therein, by those skilled in the art, without departing from the spirit and scope thereof, therefore, I do not wish to be limited to the specific details herein disclosed, but what I claim is:—

1. A bait-holder comprising, in combination, a releasable chuck member, opposed pivotal blades secured to said chuck member, inwardly extending hook portions integral with said blades, and a hook member having a substantially straight shank adapted for positive engagement with said chuck and whereby said bait is positively positioned relative to said chuck by means of said inwardly extending hooks.

2. A bait-holder comprising, in combination, a releasable chuck member, opposed pivotal spinner blades, secured to said chuck member, said blades having inwardly extending hook portions, and a hook member having an enlarged angularly disposed portion with a substantially straight shank adapted to receive a bait, said shank being adapted for engagement with said chuck whereby said bait is positively positioned relative to said spinner by means of said inwardly extending hook portions and said enlarged portion of said hook member.

EDWARD G. LEIGHTON.